May 27, 1958 M. HAMON 2,836,405

COOLING OF LIQUIDS

Filed Oct. 10, 1956 2 Sheets-Sheet 1

Inventor:
MAURICE HAMON
by Paul H. Smolka
HIS ATTORNEY

May 27, 1958 M. HAMON 2,836,405

COOLING OF LIQUIDS

Filed Oct. 10, 1956 2 Sheets-Sheet 2

Inventor:
MAURICE HAMON
by Paul H. Smolka
HIS ATTORNEY

United States Patent Office 2,836,405

Patented May 27, 1958

2,836,405

COOLING OF LIQUIDS

Maurice Hamon, Brussels, Belgium

Application October 10, 1956, Serial No. 615,192

2 Claims. (Cl. 261—112)

This invention relates to improvements in the cooling of liquids where the liquids are allowed to run along or stream upon cooling surfaces and where the latter surfaces consist of superposed interconnected elements, arranged in parallel planes.

One object of the present invention is to connect the various elements so as to be situated in perfectly vertical planes, whilst ensuring a constant and precise distance between the various vertical planes in a horizontal direction.

The invention consists in an arrangement or system for cooling liquids comprising superposed cooling elements arranged side by side in several vertical planes, characterized in that connecting elements are inserted between the parallel vertical planes in a horizontal direction, and between the superposed elements in a vertical plane, in such a manner as to ensure a precise connection simultaneously in a horizontal direction between the parallel planes and in a vertical direction between the superposed cooling elements.

Preferably, several cooling elements, or all of them, form a rigid block which does not lose its shape.

The connecting elements may be alternately connected to two cooling elements which are adjacent thereto in the same vertical plane, by hard friction to one, and by guiding alone to the other.

Other characteristic features will appear from the description given hereinafter by way of example, with reference to the accompanying drawings.

Referring to the drawings,

Fig. 1 is a vertical view, partly in section, showing several superposed cooling elements and the manner of connecting them.

Fig. 1*a* is a side view corresponding to Fig. 1.

Fig. 1*b* is a plan view corresponding to Fig. 1.

Figs. 2, 2*a* and 3, 3*a* show respectively in elevation and in a side view, and Figs. 4, 4*a*, 5, 5*a* and 6, 6*a* show respectively in elevation and in plan, various shapes for the connecting pieces.

Fig. 7 shows in a perspective view a particular shape of a connecting element.

Figs. 8 and 8*a* show a connecting element having several lower grooves, and no upper grooves; such elements are intended to be used at the upper part of the system as will be hereinafter more particularly explained.

Referring now to the drawings, a cooling element 2 is supported by two carrying members 3 provided with guiding grooves 4. The carrying members 3 may be made of concrete, wood, steel, or of any other suitable material.

When the spacing between the vertical parallel planes is comparatively large, the upper plate 2 may advantageously carry an element 1 which is inclined through a certain angle so as to close the space between the vertical planes, and to ensure a satisfactory division of the liquid when streaming upon the vertical elements 2.

The vertical cooling elements 2, of any desired width, may be provided with supporting shoulders 7. They may be made of fibro-cement, wood, steel, aluminum, plastic material, or any other suitable material.

The reference numeral 5 in Figs. 1, 2 and 3 shows a connecting element, shown on a larger scale under various shapes, in Figures 2 to 8*a*. The connecting elements are generally provided with one or several grooves at their lower part, and with one or several grooves at their upper part. Preferably, the adjacent connecting piece enters the lower groove or grooves with hard friction; the upper connecting element may be simply guided in the upper groove or grooves.

The connecting elements may be made of wood, steel, plastic material, glass, porcelain, fibro-cement, or any other suitable material.

The reference numeral 1 of the drawings shows an upper cooling element used at the top of the system when the distance between the vertical planes is comparatively large. Such an element 1 is inclined so as to close the space underneath between two vertical cooling surfaces and to ensure a better distribution of the cooling liquid upon the latter. An element 1 may also be made of various materials, such as those used for the other connecting elements.

Figs. 3, 3*a*, 6 and 6*a* show a connecting element with an inclined groove or grooves intended to receive an inclined element or inclined elements 1.

Figures 2, 2*a* and 4, 4*a* show similar pieces to those of Figures 3, 3*a*, 6, 6*a*, but provided with vertical grooves.

Figures 5, 5*a* and 8, 8*a* show upper connecting pieces or elements having grooves only at their lower part; they are used at the upper part of the system when inclined elements 1 are not provided.

Figure 1:
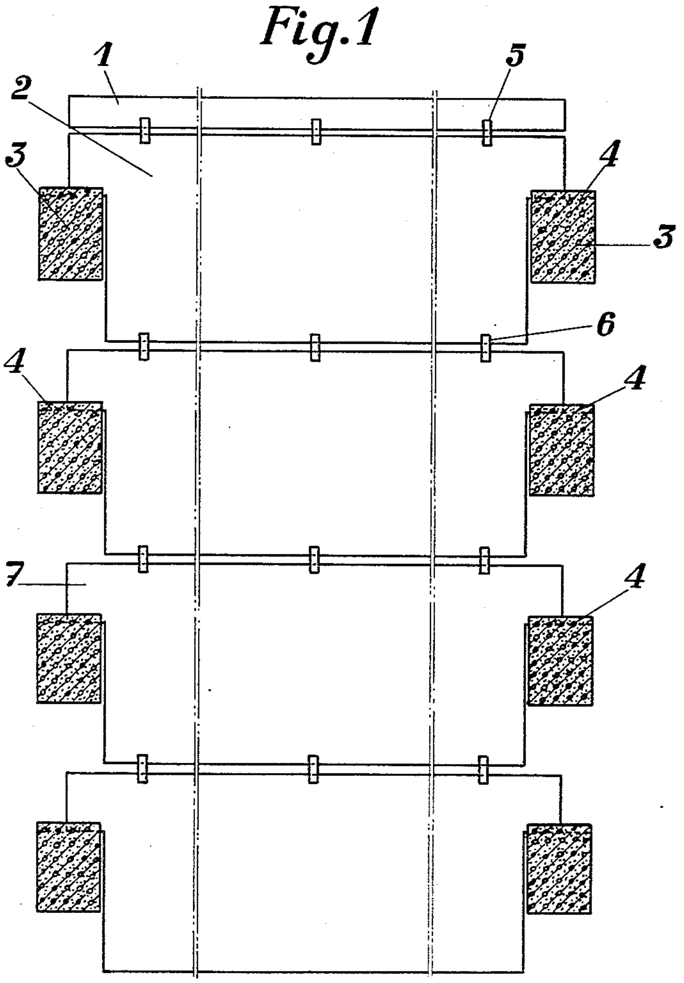
Figure 1A:
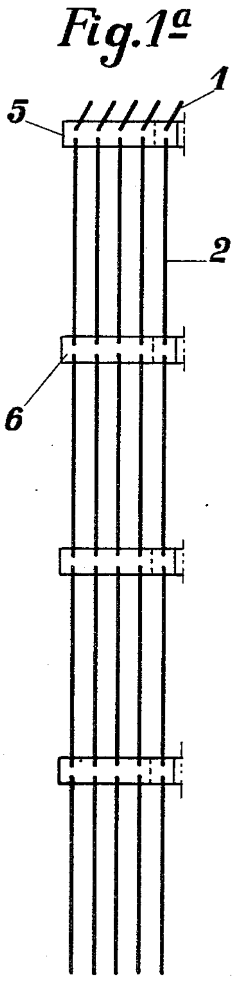
Figure 1B:
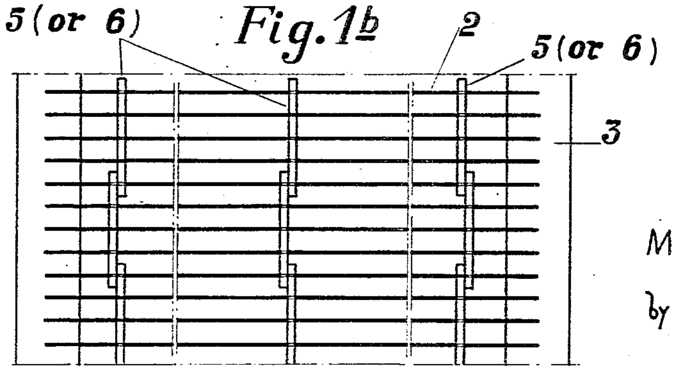
Figure 2:
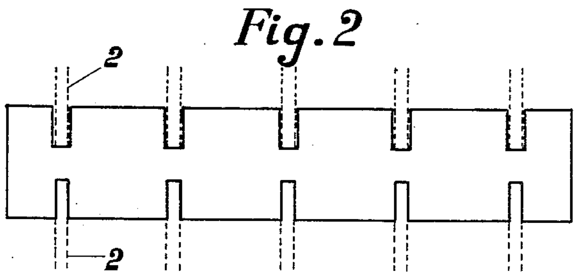
Figure 2A:
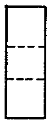
Figure 3:
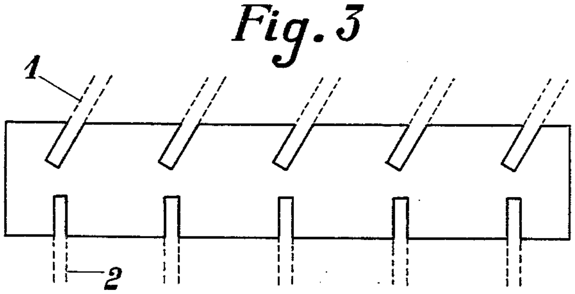
Figure 3A:
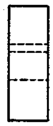
Figure 4:
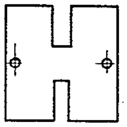
Figure 5:
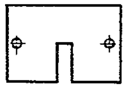
Figure 8:
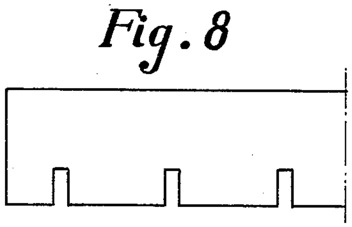
Figure 4A:
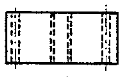
Figure 5A:
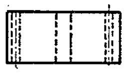
Figure 8A:
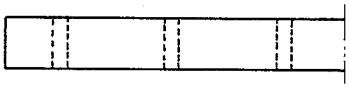
Figure 6:
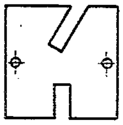
Fig. 6 shows a connecting element with one lower vertical groove and one upper inclined groove.
Figure 7:
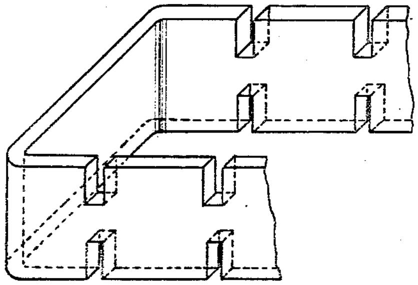
Fig. 7 shows a connecting element made of plastic material consisting of two parallel walls connected to each other by means of a perpendicular wall which maintains a precise distance between the two parallel walls, and having vertical grooves for the insertion of the adjacent cooling elements.
Figure 6A:
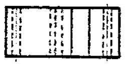

Fig. 1*b* shows how the connecting pieces 5 (or 6) may be arranged in plan to form a rigid block: alternately, the ends of a connecting piece 5 (or 6) are placed with overlapping over a certain distance, upon the ends of the two adjacent connecting elements.

Various modifications may be made in the mode of carrying the invention into effect. For instance, the number of grooves, their arrangement, the material used for the various parts, may vary according to the economical, or other conditions.

I claim:

1. A plate assembly for liquid cooling installations comprising a plurality of horizontally extending substantially flat plates grouped in superposed and spaced relation in each of several vertical parallel planes; adjacent plates in said vertical planes forming horizontal rows; stationary supports freely engaging the ends of the plates of each row to hold the plates in suspended position; distancing connectors extending perpendicularly to said planes between each pair of an upper and a lower row of plates; an upper and a lower series of spaced vertical slots in each connector, said slots adapted to receive the border portions of the plates of said upper and lower rows respectively; the border portions of the plates of each upper row resting loosely in their respective slots having a width exceeding the thickness of said border portions and the border portion of the plates of each lower row being frictionally held in their respective slots having a width substantially equal to the thickness of said border portions.

2. A plate assembly for liquid cooling installations according to claim 1 wherein each of said distancing connectors comprises a plurality of aligned components mutually overlapping each other at their ends.

References Cited in the file of this patent

UNITED STATES PATENTS

| | | |
|---|---|---|
| 2,330,901 | Mart | Oct. 5, 1943 |
| 2,356,192 | Yingling | Aug. 22, 1944 |
| 2,661,197 | Norman | Dec. 1, 1953 |
| 2,759,719 | Odenthal | Aug. 21, 1956 |

FOREIGN PATENTS

| | | |
|---|---|---|
| 16,635 | Great Britain | Aug. 16, 1905 |
| 518,373 | Great Britain | Feb. 26, 1940 |
| 571,510 | Great Britain | Aug. 28, 1945 |